United States Patent [19]

Lacroix

[11] Patent Number: 4,723,918

[45] Date of Patent: Feb. 9, 1988

[54] CONNECTION DEVICE

[76] Inventor: Jacques Lacroix, 12, Allée de la Pommeraie, 91570 Bievres (Essonnes), France

[21] Appl. No.: 888,328
[22] PCT Filed: Nov. 12, 1985
[86] PCT No.: PCT/FR85/00320
  § 371 Date: Oct. 31, 1986
  § 102(e) Date: Oct. 31, 1986
[87] PCT Pub. No.: WO86/03063
  PCT Pub. Date: May 22, 1986

[30] Foreign Application Priority Data

Nov. 12, 1984 [FR] France ................. 84 17192

[51] Int. Cl.$^4$ ............................................. H01R 4/24
[52] U.S. Cl. ...................................... 439/397; 439/417
[58] Field of Search .............. 439/387, 389, 391, 392, 439/393, 397, 417

[56] References Cited

U.S. PATENT DOCUMENTS 4,550,970 11/1985 Ogino ................................. 439/417

Primary Examiner—Joseph H. McGlynn
Attorney, Agent, or Firm—Jacobs & Jacobs

[57] ABSTRACT

A connection device is provided for connecting sheathed conducting wires comprising a housing in which is formed a passage for insertion of the wires, inside the housing a catch with a reception opening, a lower edge of which forms a stripping edge, a drawer slidable in the housing transversely to the sheaths and having a clip provided with slits for pulling the wires and fitting on to the catch. The slits of the clip grip the ends of the wires leaving the opening, pull them downwardly of the housing until they come into abutment against a bottom, while the edge strips it longitudinally. The wires are firmly held in a zigzag obstacle.

7 Claims, 7 Drawing Figures

CONNECTION DEVICE

BACKGROUND OF THE INVENTION

1. Field of the invention

The present invention relates to a device for connecting at least two conducting wires each surrounded by an insulating sheath comprising a housing in which is formed a passage for inserting an end portion of the sheathed wires, means for receiving said end portions in the housing, means adaped for being inserted into the housing transversally to the sheaths and cooperating with the means for receiving the sheaths for stripping the wires longitudinally.

The device of the invention serves for connecting wires with several strands or, and preferably, with a single strand.

2. Description of the Prior Art

Such connection devices are already known.

French patent application No. 8 106 718 describes one in which a catch having a reception opening and a conducting clip having a cutting edge cooperate for bending the end portion of the wires extending beyond the opening of the catch, the clip by its cutting edge stripping this end portion after having bent it. In this device, the stripped wires are clamped or locked between the clip and the catch.

U.S. Pat. No. 4,053,197 describes a connection device in which the end portion of the wires is driven along a cutting edge of a catch, as far as the free end of this portion, the wires being formed on the side of their length adjacent this end portion, before this latter is clamped or locked. In this device, once stripped and clamped the wires are no longer bent.

All the devices of the prior art and especially those mentioned above have drawbacks. Either the insulator of the sheath, during stripping is removed, which causes waste or else the mechanical strength and particularly the tensile strength is not excellent. In all cases, the electric connection is provided by surfaces whose contact may not be sufficient.

The present invention overcomes these drawbacks.

SUMMARY OF THE INVENTION

For this, the present invention relates to a connection device of the above-mentioned type, characterized by the fact that the housing has an abutment surface parallel to the direction of insertion of the wires for their end portion, the reception means have a conducting stripping edge and said means inserted into the housing comprise at least two slits adapted for gripping the sheaths of the wires and drawing them inwardly and towards the bottom of the housing and against the stripping edge.

In the connection device of the invention, the abutment surface of the housing, the bottom of the slits of the wire drawing means and the reception means with their stripping edge, form a zigzag obstacle by which the wires are bent twice, substantially at 90° in opposite directions. Thus, the mechanical strength or connection is perfectly ensured. Furthermore, the stripping edge only causes lateral creep of the insulator of the sheath, without causing waste. The electrical connection, along this sharp stripping edge is also excellent.

BRIEF DESCRIPTION OF THE DRAWINGS

The invention will be better understood from reading the following description of a preferred embodiment of the device of the invention, made with reference to the accompanying drawings in which.

DESCRIPTION OF THE PREFERRED EMBODIMENT

Figure 2:
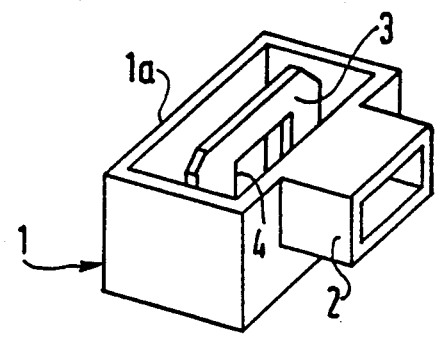
FIG. 2 shows a schematical view in a different perspective of the housing of the device of the invention.

The device shown (FIG. 2) comprises a substantially parallelepipedic housing 1 comprising on one of its front faces a chimney 2 for leading in wires, of substantially rectangular section. The housing is open on its upper face. The housing may for example be made from a molded plastic material.

Figure 3:
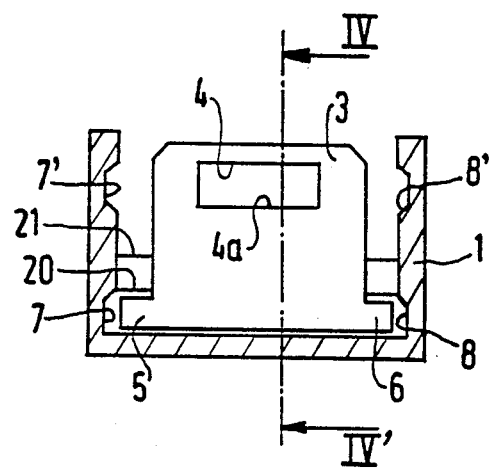
FIG. 3 shows a front view, in section, of the housing of FIG. 2, before insertion of the wires.
Figure 4:
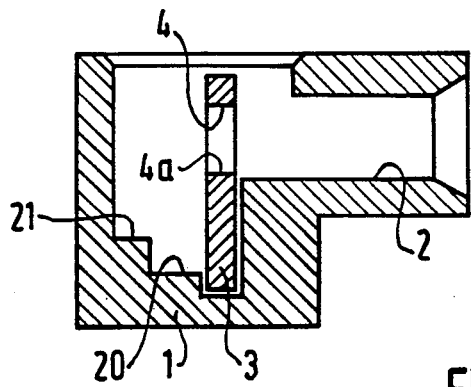
FIG. 4 shows a side view in section along line IV—IV' of FIG. 3.

Inside the housing, perpendicular to its open face and facing the opening of chimney 2 is provided a reception catch 3, which is rigid and substantially rectangular in shape and has in the extension of its chimney 2 an opening 4 through which the wires pass, and whose section is substantially equal to that of the chimney 2 (FIG. 4) or preferably slightly larger. The catch has on the lower edge of opening 4, and on the inner side, a stripping and electrical connection edge 4a. Catch 3 is, in the example considered, made from phosphor bronze which is resistant and a good conductor of electricity. Catch 3 comprises at its base (FIG. 3) two centering studs 5, 6 intended, when this latter is placed in the housing, to give it a correct position. The upper part of catch 3 is substantially narrower than the inner length of housing 1, for reasons which will be explained subsequently.

Behind catch 3 or on the other side from chimney 2, the bottom of housing 1 is raised at 20, first of all to form a groove receiving the catch 3 then, behind level 20, at 21, at a substantially higher level than level 20 so as to provide an abutment surface for the end portions of the wires to be connected, parallel to chimney 2.

The device further comprises a hollow drawer 9 (FIG. 1) also of a general parallelepipedic shape, and whose external dimensions are substantially equal to the inner dimensions of housing 1. It may also be made from a molded plastic material. Drawer 9 comprises an open face and, on one of its front faces 10, a recess 11. The advantage of such a shape for the drawer will be seen further on.

The inside of drawer 9 is shaped so as to receive and to hold a clip 12 in position. Clip 12 consists of a substantially rectangular plate whose narrowest edges have been previously bent through an angle of about 180°, each on the same side. It should be noted that an angle greater than 90° would provide the function. The diameter of the bends and the thickness of the plate formin clip 12 are such that this latter may, as will be seen further on, cooperate by fitting together with the catch 3. Similarly, catch 3 may have curved edges, instead of those of the clip 12, which would then be flat, but this is a less satisfactory solution. Clip 12 here comprises three slits 13, of a width slightly less than the diameter of the sheath of the wires to be connected, but greater than the diameter of their core, formed from the low part of the clip the one introduced first into the housing. The height is slightly greater than the diameter of the sheath of the wires. For previous assembly of the drawer 9 and its clip 12, clip 12 is disposed in drawer 9 so that the two curves face the face 10 comprising the recess 11. In the present example, clip 12 is forcibly held in position in drawer 9 and its positioning is ensured by groove situated on the side faces of the drawer.

The operation of the device is as follows.

Figure 5:
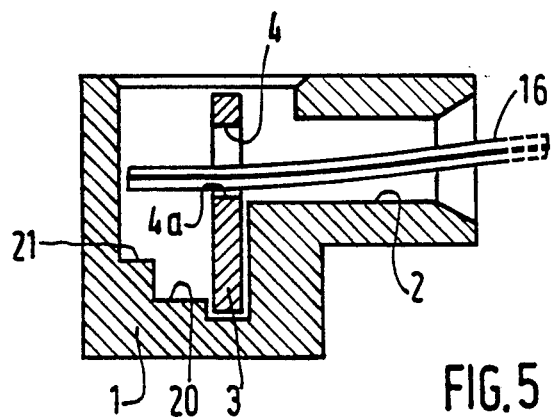
FIG. 5 shows a lateral sectional view, similar to FIG. 4, of the device after insertion of the wires.
Figure 6:
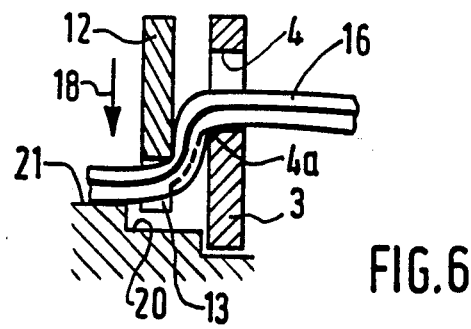
FIG. 6 shows a partial lateral view of the device, in section, after the wires have been stripped.

Through the insertion passage or chimney 2 are inserted the unstripped ends of the sheathed conducting wires to be connected electrically and mechanically and only a single one 16 of which is visible in FIGS. 5 and 6. The wires are inserted so that their end portion passes through the opening 4 of the reception catch 3 and come into abutment against the face 1a of the housing, the face opposite the face carrying chimney 2. It is this step which is illustrated in FIG. 5 of the drawings.

Then the drawer 9 is brought against housing 1 so that their open faces coincide and are parallel.

It should be noted that catch 3 and clip 12 are placed respectively in the housing 1 and drawer 9 so that, when the drawer penetrates into the housing, clip 12 fits on to catch 3, its two curves surrounding the edges of the catch.

The following step of the operation, or of the assembly, is illustrated in FIG. 6. Drawer 9 with the clip 12 has been pushed in the direction of arrow 18 inwardly of housing 1, for example using a pair of general purpose pliers, until the slits 13 of clip 12, after having gripped each one the sheath of a wire to be connected, slightly short of its free end, and pulled the wire inwardly and towards the bottom of the housing 1, position the end portions of the wires in abutment against the upper bottom 21, clip 12 itself coming into abutment against the intermediate bottom 20.

Recess 30 allows the drawer 9 to be pushed into housing 1 without the vertical position of the wires between the chimney and the catch being altered. The need of relatively precise centering of the catch, as well as lateral spaces between the housing and the catch will be readily understood, as was mentioned above.

Figure 7:
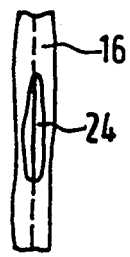
FIG. 7 shows a bottom view of one of the stripped wires.

When the wires, gripped in its slits 13, are pulled by clip 12, they are bent portion by portion so as to mate substantially with the two surface portions adjacent the edge 4a of the catch 3. Simultaneously, the edge 4a strips them over a part 24 only of the thickness of their insulating sheath while causing the insulation to creep laterally (FIG. 7). In the bottom part, clip 12 and the upper bottom 21 bend the wires a second time but in the other direction so that once the connection is made catch 3, clip 12 and bottom 21 form a zigzag obstacle for the wires which are thus firmly locked. Considering the direction of movement of clip 12, the bending angles of the wires are substantially equal to 90°, in one direction and in the other. Considering the movement of the wires, the stripping edge attacks their sheaths in the longitudinal direction, from the front rearwardly or from a certain distance from the free end of the wires to a greater distance from this end.

Taking into account the spacing between the clip 12 and catch 3, slightly less than the diameter of the sheaths of the wires, each wire is in electric contact with catch 3, by the stripping edge 4a and a portion of the adjacent inner wall vertical in FIG. 6. The cores of the wires are thus in electric contact with each other.

Figure 1:
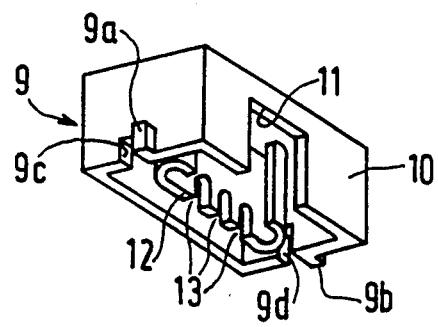
FIG. 1 shows a schematical view in perspective of the drawer of the device of the invention.

It will be noted in FIG. 1 that the drawer 9 comprises two lateral studs 9a, 9b for cooperating, when the drawer is completely pushed in, with recesses 7, 8 provided in the housing, so as to maintain the whole firmly closed. It can be seen that the centering studs 5, 6 of catch 3 could prevent the drawer from reaching the bottom of the housing. To avoid that, two recesses 9c, 9d substantially adjacent the studs 9a, 9b are provided on the lateral walls of the drawer.

With the device which has just been described, the simultaneous connection of three wires may be made since clip 12 comprises three slits 13.

Multi-strand wires or single strand wires may be connected, the device being particularly well adapted thereto.

Providing clip 12 is provided with a certain resilience and that slits 23 may grip them between their walls, wires of different diameters may be connected together.

Furthermore, for the sake of convenience, there may be provided inside the housing, vertically aligned with recesses 7, 8 two additional recesses 7', 8' for preinserting drawer 9 rigidly in housing 1 through said studs 9a, 9b of the drawer, the position of the drawer 9 then being such that the opening 4 in the catch 3 is not closed by the clip 12. The sheathed wires may then be introduced without any problem as described above.

Finally, for maintaining the catch firmly in the case, it may be provided with a base, i.e. with its width at the level of studs 5, 6 slightly greater than the width of the housing in the corresponding region so that the studs are anchored in the walls of the housing, made from an appropriate material for this purpose, by deforming them.

Of course, all the modifications of shape of the device not affecting its essential functions may be made without departing from the scope of the invention. In particular, the clip may or may not be made from metal to the extent that it does not play a conducting role. It may for example be integral with the drawer. Similarly, the catch may possibly be partially nonconducting. Only its edge and its facing contact with the cores of the wires, after fitting, must provide good electric conduction.

Finally, the clip and the catch may be respectively positioned and held in place in the drawer and the housing by any known means.

Obviously the invention finds it's application in all kinds of industries where conductors are to be connected, for example in the aerospatial and telephone industries.

I claim:

1. A device for connecting at least two conducting wires each surrounded by an insulating sheath, comprising a case in which is formed a passage for inserting an end portion of the sheathed wires, means for receiving said end portions in the housing, means adapted for being inserted into the housing transversely to the sheaths and cooperating with the means receiving the sheaths for stripping the wires longitudinally, wherein the housing has an abutment surface parallel to the direction of insertion of the wires for their end portion, the reception means having a conducting stripping edge and said means inserted into the housing comprise at least two slits adapted for gripping the sheaths of the wires and pulling them inwardly and towards the bottom of the housing and against the stripping edge.

2. The device as claimed in claim 1, wherein the stripping edge is adapted so as to cause the insulation of the sheaths of the wires to be connected to creep laterally.

3. The device as claimed in claim 1, wherein the stripping edge, the pulling slits and the abutment surface of the housing form a zigzag obstacle locking the wires.

4. The device as claimed in claim 1, wherein the reception means comprise a catch extending in the housing transversely to said insertion passage and in which is formed a reception opening.

5. The device as claimed in claim 4, wherein the reception opening is aligned with the insertion passage.

6. The device as claimed in claim 4, wherein the means for drawing the wires comprise a clip adapted for surrounding the catch at least partially and in which said slits are formed.

7. The device as claimed in claim 4, wherein the stripping edge is formed on the lower edge and inside the reception opening of the catch.

* * * * *